Aug. 17, 1943.  J. W. OVERBEKE ET AL  2,327,210
VALVE
Filed Aug. 23, 1941

Inventors
JOHN WILLIAM OVERBEKE,
HARRY P. KUPIEC,

By George Douglas Jones
Attorney

Patented Aug. 17, 1943

2,327,210

UNITED STATES PATENT OFFICE 2,327,210

VALVE

John W. Overbeke, Anneslie, and Harry P. Kupiec, Baltimore, Md., assignors to The Glenn L. Martin Company, Baltimore, Md.

Application August 23, 1941, Serial No. 408,016

2 Claims. (Cl. 121—46.5)

This invention is directed to the emergency operation of a hydraulic system, and to a novel valve for such system.

In aircraft, many parts are operated by hydraulic pressure. As the hydraulic pressure lines may fail, it is desirable to provide emergency systems for operating the hydraulic motors. Such systems must be lightweight, compact, and easily and readily put into operation. The objects of this invention are to create a satisfactory emergency system, including the novel construction of a valve for automatically effecting the operation of the system, and means for indicating that the source of reserve pressure has been used.

Generally the invention comprises a hydraulic system for operating a motor, a flask of air under pressure, and a valve which, when the air pressure from the flask is turned on, automatically cuts off the regular hydraulic line, and substitutes the air pressure in the system for operating the hydraulic motor. At the same time the action of the valve causes an indicator to be actuated to show that the emergency air pressure has been used.

The means for obtaining the objects of the invention are more fully described with reference to the accompanying drawing in which:

Fig. 1 is a diagrammatic view of the hydraulic system, including a cross-sectional view of the novel valve; and Fig. 2 is a cross-sectional view through the valve on the plane indicated by the line 2—2, Fig. 1.

The hydraulic system and valve illustrated in the drawing have been especially developed for, and are described with reference to, the operation of bomb bay doors and bomb racks in an aircraft, although it is to be understood that the invention is applicable to the emergency operation of any hydraulic motor, particularly in an aircraft.

The normal hydraulic system comprises a fluid reservoir 2 connected by pipe 4 to a hydraulic pump and control valve 6. A hydraulic accumulator 8 is also joined to valve 6 by pipe 10.

Motor 12, including a double acting piston 14 with connecting rods 16 and 18, is joined at one end of the cylinder in which piston 14 is mounted to valve 6 by pipe 20, valve 22, pipe 24, valve 26, and pipe 28. The other side of motor 12 is connected to valve 6 by pipe 30, valve 22, and pipe 34.

Valve 22 is especially constructed to take care of the emergency occurring should pipe 24 break or otherwise fail. Generally, the valve is composed of a center section 36, and two end sections 38a and 38b, respectively, which are similar to each other.

Center section 36 is longitudinally bored to form a cylinder 40. A port 42 is approximately midway the length of section 36, while a port 44 is adjacent an end of section 36. On the opposite side of section 36, approximately midway between ports 42 and 44, a small safety or pneumatic release valve 46 is coupled to section 36, and is placed in communication with cylinder 40 by an obliquely disposed bore 48, it being noted that the entrance of bore 48 into cylinder 40 is slightly longitudinally offset from port 42. Between port 42 and the end of section 36 is a port 50.

Each end section 38a and 38b includes chambers 52a and 52b, respectively, coaxial with cylinder 40 and of larger diameter than cylinder 40. In line with this axis are ports 54a and 54b, respectively, which on the ends facing the chambers are provided with seats adapted to receive piston heads. Extending transversely of chambers 52a and 52b are ports 56a and 56b. Each of the sections 38a and 38b is threaded or otherwise secured to center section 36, with suitable packing 58 therebetween.

Two separate pistons are mounted within cylinder 40. Piston 60 has a body lying in cylinder 40, this body being of a length sufficient to leave port 50 partially open when piston 60 is in its innermost position in cylinder 40. The head 61 of piston 60 is of self-seating construction so that it can be tightly seated on port 54b. A collar 63 between the piston head and body limits the movement of the piston into cylinder 40 by abutting against the end of section 36, and piston 60 is normally held in this position by spring 62b.

Piston 64 is composed of two body portions 65 and 66 separated by a narrow neck portion 67. Body portion 66 is fluted by longitudinal grooves 68, note Fig. 2, so that fluid can flow by portion 66. The head 69 of piston 64 lies in chamber 52a of section 38a, and is constructed to be tightly seatable on port 54a. Between piston head 69 and body portion 66 is a collar 70 for limiting the inward movement of piston 64 into cylinder 40. Normally the piston is held in this position by a spring 62a, and the length of the piston is such that when in this position, port 44 is uncovered by the neck portion, while port 48 is closed. When the piston is moved to be seated on port 54a in section 38a, port 44 remains open while port 48 is opened.

Port 42 is connected by pipe 71 and valve 72 to a flask 74 filled with compressed gas. Joined to pipe 71 is a gas release valve 76 and discharge fitting 78.

Port 44 is connected by pipe 80 to an indicator 82. This indicator includes a disc frangible under fluid pressure, the breaking of the disk forming the indicating means.

Port 50 is connected to valve 26 by a pipe 84. Preferably valve 26 is of the type described in the copending application of John W. Overbeke, filed August 19, 1941, S. N. 407,450, now Patent No. 2,300,694 dated November 3, 1942, and operates so that only line 84 or line 24 can be open to line 28 at any one time.

The operation of the hydraulic system and the valve 22 is as follows:

Under ordinary conditions, if it is desired to open the bomb bay doors, the valve 6 is turned so that fluid enters pipe 20, passes through port 56b, of section 38b, chamber 52b, port 54b, line 24, valve 26, line 28 to motor 12. The fluid pressure in the motor drives piston 14 to the left in Fig. 1, and the movement of connecting rods 16 and 18 opens the doors. It is noted that piston 60 in valve 22 is not moved.

Fluid is simultaneously exhausted from motor 12 through pipe 34, chamber 52a of section 38a, pipe 30 to valve 6, and through pipe 4 to reservoir 2. Piston 64 in valve 22 is unmoved. When the doors are closed, and piston 14 moves to the right in Fig. 1, a reverse movement of the fluid takes place in the lines without moving pistons 60 and 64 in valve 22.

If either pipe line 20 or pipe 24 should break or otherwise fail, valve 72 is opened manually to permit air under pressure to flow into cylinder 40 of valve 22. This air pressure immediately forces piston 60 to the right and seats the piston head 61 on port 54b, thus stopping any fluid flow through pipe 24. At the same time the air under pressure passes through port 50, and line 84 into valve 26, which is automatically actuated by the air pressure to close off pipe 24 and permit the air to pass through line 28 into motor 12, wherein the air pressure forces piston 14 to the left and the doors are opened.

Returning to valve 22, the air pressure in cylinder 40 also forces piston 64 to the left until its piston head 69 is seated on port 54a. Port 48, which is intermediate the pairs of ports 56a—44 and 56b—50, is thus opened so that excessive pressure is relieved through valve 46. Fluid discharged from motor 12 by movement of piston 14 to the left, enters port 56a of section 38a, into chamber 52a. As port 54a is closed off, the fluid is forced through grooves 68, past the neck portion of piston 64, through port 44, and line 80 into indicator 82. The fluid pressure in the indicator breaks the membrane therein, thus indicating that the emergency pressure has been used.

To close the doors after they have been opened by gas pressure from flask 74, valve 76 is opened to release the gas pressure in the system through fitting 78. Pistons 60 and 64 are then returned to their normal positions by springs 62b and 62a, respectively. By actuating valve 6, fluid flow can take place through pipes 30 and 34 to operate motor 12 to close the doors.

The objects of the invention are thereby achieved. The emergency pressure system is simple, compact, lightweight and of positive operation. In emergency operation, only valve 72 is manually operated, while valve 22 then automatically functions to cut off the broken line, to provide a passageway for the operation of the motor by gas pressure, and to provide a passageway for the operation of the indicator by fluid pressure.

The means for obtaining the objects of the invention having now been described:

We claim:

1. A valve for interconnecting a source of gas pressure with a hydraulic system, comprising a cylinder, first ports at opposite ends of said cylinder coaxial therewith, second ports in said cylinder each respectively being adjacent one of the first ports, said first and second ports being adapted to connect said valve in said system, a third port between said second ports and adapted to be connected to the source of gas pressure, a fourth port between said second ports and adapted to be connected to said hydraulic system, a fifth port adjacent said third port and adapted to be connected to an indicator, and bodies in said cylinder movable in response to gas pressure entering said third port to close off said first ports and increase communication between said third and fourth ports, the movable body adjacent said fifth port including means for providing communication between one of the adjacent pairs of ports and said fifth port.

2. A valve for interconnecting a source of gas pressure with a hydraulic system, comprising a first cylinder section with three longitudinally spaced ports transversely of the section and an intermediate pressure relief port between two of the three longitudinally spaced ports, a pair of end sections, each of which is secured to an end of said cylinder section and each of which comprises a chamber of larger diameter than said cylinder and a pair of ports communicating with each of said chambers, one port of each pair being coaxial with said cylinder section, and a pair of spaced pistons movably mounted in said cylinder section, each of which is displaceable to close a port coaxial with said cylinder and concurrently to open communication between pairs of ports, one of said pistons including an individual body portion movable therewith to open the intermediate pressure relief port to communication with a pair of ports placed in open communication by the other of said pistons, the middle port of the first cylinder section being arranged between the pistons and being connected to the source of gas pressure.

JOHN W. OVERBEKE.
HARRY P. KUPIEC.